United States Patent [19]
Kanai et al.

[11] 3,755,296
[45] Aug. 28, 1973

[54] PROCESS FOR PREPARING 1-β-D-ARABINOFURANOSYL-CYTOSINE AND 2,2'-CYCLOCYTIDINE

[75] Inventors: Tadashi Kanai; Kiyomi Kikugawa; Saeko Asakura; Osamu Maruyama; Motonobu Ichino; Tokuro Nakamura, all of Oita-ken, Japan

[73] Assignee: Kohjin Co., Ltd., Tokyo, Japan

[22] Filed: July 17, 1970

[21] Appl. No.: 55,966

[30] Foreign Application Priority Data
July 24, 1969 Japan.............................. 44/58517
Dec. 4, 1969 Japan.............................. 44/97482
Dec. 4, 1969 Japan.............................. 44/97483
Mar. 24, 1970 Japan.............................. 45/24744

[52] U.S. Cl........................................ 260/211.5 R
[51] Int. Cl........................................ C07d 51/52
[58] Field of Search.......................... 260/211.5 R

[56] References Cited
UNITED STATES PATENTS
3,155,646  11/1964  Hunter.......................... 260/211.5 R
3,463,772  8/1969  Nagyvary..................... 260/211.5 R
3,595,853  7/1971  Kanai et al.................... 260/211.5 R FOREIGN PATENTS OR APPLICATIONS
4,313,214  6/1968  Japan............................ 260/211.5

OTHER PUBLICATIONS
Wolfrom, "Advances in Carbohydrate Chem.", Vol. 22, 1967, Academic Press, New York, N.Y., pp. 350–353
Wolfrom, "Advances in Carbohydrate Chem.", Vol. 24, 1969, Academic Press, New York, N.Y., pp. 180–184.

*Primary Examiner*—Lewis Gotts
*Assistant Examiner*—Johnnie R. Brown
*Attorney*—McGlew and Toren

[57] ABSTRACT

The present invention relates to a novel process for preparing 1-β-D-arabinofuranosylcytosine (spongocytidine) expressed by the general formula (I) and a process for preparing as an intermediate thereof 2,2'-cyclocytidine(2,2'-anhydro-1-β-D-arabinofuranosylcytosine) (II) with good efficiency.

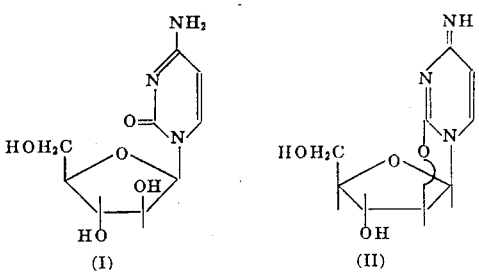

17 Claims, No Drawings

PROCESS FOR PREPARING 1-β-D-ARABINOFURANOSYL-CYTOSINE AND 2,2'-CYCLOCYTIDINE

The known processes for preparing 1-β-D-arabinofuranosylcytosine include the following four processes.

1. The process of synthesis via a 1-β-D-arabinofuranosylthiouracil derivative which is produced in four stages starting from 1-β-D-arabinofuranosyluracil that is obtained in five stages from uracil. (Evans and others; Proceedings of the Society of Experimental Biology and Medicine, 106, 350 (1961) and U.S. Pat. No. 3,116,282).

2. The process in which $N^4, O^{3'}, 5'$-triacylcytidine is prepared from cytidine in 3 stage reactions. Then the 2'-position is tosylated and the product is kept standing in water at room temperature and finally it is deacylated. (Reese and others; Tetrahedron Letters, 3499 (1966)).

3. The process in which 2,2'-cyclocytidine-3',5'-diphosphate, obtained as by-product of the reaction of cytidine with polyphosphoric acid, is hydrolyzed by alkali and further by phosphatase. (Walwick and others; Proceedings of the Chemical Society, 84 (1959); Journal of Organic Chemistry, 32, 816 (1967)).

4. The process in which 2,3,5-tri-O-benzylarabinofuranosylchloride is condensed with the 2,4-dimethoxypyrimidine, sodium salt of 4-methylthiopyrimidine-2-one, and mercury salt of $N^4$-acetylcytosine, producing, respectively, 1-(2',3',5'-tri-O-benzyl-β-D-arabinofuranosyl)-4-methoxy-2(1H)-pyrimidinone, 1-(2',3',5'-tri-O-benzyl-β-D-arabinofurasyl)-4-methylthiopyrimidine-2-one, and, $N^4$-acetyl-1-(2',3',5'-tri-O-benzyl-β-D-arabinofuranosyl)-cytosine and the former two are made to react with ammonia and the latter one is hydrolyzed with alkali followed by reduction. (Shen and others; Journal of Organic Chemistry, 30, 835 (1965)).

The processes in (1), (2) and (4) contain faults in that they require many stages of reactions and, if starting from a readily available material, extremely complicated procedures have to be followed and the yields are remarkably low. More particularly, in the process of (2) the intermediate material, $N^4, O^{3',5'}$-triacylcytidine, is difficult to synthesize and in the process of (4) the condensation reactions of 2,3,5-tri-O-benzylarabinofuranosyl chloride with bases are of low yield. In the process of (3), however, the object material can be synthesized with relative ease from cytidine, but an enzyme (phosphatase) is required in the process.

The process inventors have already developed a process for preparing the mentioned substance employing nitric esters of cytidine as an intermediate (U.S. Pat., Ser. No. 812,367 now U.S. Pat. No. 3,595,853), but the present invention provides a profitable method that far exceeds the foregoing ones.

In considering that the previous process for preparing 1β-D-arabinofuranosylcytosine was very complicated and of a low yield, the present inventors have investigated and succeeded in the first process of this invention, in which the object material could be isolated with a high yield of about 70 percent without isolating nor purifying the intermediate 2,2'-cyclocytidine that was obtained from cytidine in a single stage of process.

The first process of this invention relates to a process for directly preparing 1-β-D-arabinofuranosylcytosine in a single stage of operation without isolating the intermediary 2,2'-cyclocytidine by reacting cytidine with a halomethylenedimethylammonium halide having the general formula,

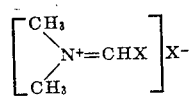

where X stands for Cl or Br.

In carrying out the first process of this invention, cytidine is dissolved in a solution of halomethylenedimethylammonium halide in a solvent such as dimethylformamide, and the mixture is then stirred at room temperature for several hours to form an intermediate 2,2'-cyclocytidine. By adding this mixture to water and adjusting the pH to 9 to 12 with an alkali, such as, sodium hydroxide, potassium hydroxide, concentrated ammonia, sodium alcoholate and potassium alcoholate, the object material can be produced by hydrolysis. The process of this invention is thus characterized by preparing 1-β-D-arabinofuranosylcytosine with a good yield in a single stage of operation starting from cytidine, because the process of this invention does not involve isolation and purification of the intermediate, 2,2'-cyclocytidine, but rather involves hydrolyzing the reaction solution. The halomethylenedimethylammonium halide used in the process of this invention can be synthesized by reacting dimethylformamide at room temperature for from several to ten minutes in an organic solvent with an equimolar amount of a halogenating agent such as thionyl chloride, thionyl bromide, phosphorus oxychloride, phosphorus oxybromide, phosphorus trichloride, phosphorus tribromide, phosgene, phosphorus pentachloride, phosphorus pentabromide and chlorine. A halomethylenedimethylammonium halide synthesized in any of the known methods may be used in the present invention. This reagent obtained from the reaction of dimethylformamide with a halogenating agent, either isolated or not may also be used. The reaction medium to be used in the present invention is selected from a group of solvents which dissolve cytidine and other reagents without decomposition, and dimethylformamide which is a component material for preparing the reagent is most conveniently used as the reaction solvent. In the process of this invention, the amounts of reagents should be present in a molar ratio of 2 to 20 times that of cytidine, the reaction temperature 10° to 30°C and the time of reaction from 1 to 10 hours.

The 1-β-D-arabinofuranosylcytosine produced by the process of this invention is prepared as follows: the reaction mixture is added to water, the pH is adjusted to 9 to 12, kept at this value for several minutes and then adjusted to pH 2.0, the nucleoside is absorbed onto 5 to 30 times as much active charcoal, which is washed with a hydrochloric acid solution to remove salt, washed with water, and then after the pH of the washings rises above pH 4.0, the nucleoside on the charcoal is eluted with a mixed solution of 20 to 90 percent aqueous methyl alcohol and pyridine or concentrated ammonia in a volume ratio of 4 : 1. The eluent contains 1-β-D-arabinofuranosylcytosine and a small amount of unreacted cytidine.

To remove the remaining cytidine, a column of an anion exchanging resin, for example Dowex-1 × 2 (borate type), is used to adsorb cytidine alone. Alternatively, column chromatography with an OH-type anion exchanging resin such as, for example, Dowex 1 × 2 (OH-type) is used and the remaining cytidine is eluted with 30 percent aqueous methyl alcohol and then then 1-β-D-arabinofuranosylcytosine is eluted with a 0.1M solution of ammonium bicarbonate to obtain a pure product of the latter. (Dekker and others, Journal of the American Chemical Society, 87, 4027 (1965)).

The second process of this invention is characterized by synthesizing 1-β-D-arabinofuranosylcytosine by the process, in which cytidine is treated with partially hydrated phosphorus oxychloride, or partially hydrated phosphorus oxybromide, or a mixture of a tertiary alcohol such as tert-butyl alcohol with phosphorus oxychloride, or a mixture of tertiary alcohol such as tert-butyl alcohol with phosphorus oxybromide, or dichlorophosphoric acid to derive 2,2'-cyclocytidine, and this is then hydrolyzed with an alkali such as sodium hydroxide, potassium hydroxide, concentrated ammonia, sodium alcoholate and potassium alcoholate to obtain the final product. The solvent in which the above reactions are performed, may be freely selected, so long as the solvent does not unfavorably influence the reactions, and esters of acetic acid are most favourably used.

The most predominant feature of this invention consists in producing 1-β-D-arabinofuranosylcytosine in one step from cytidine, because the process of this invention, without obtaining any acyl compound, produces 2,2'-cyclocytidine as intermediate which, instead of being isolated, is hydrolyzed directly in the solution to obtain 1-β-D-arabinofuranosylcytosine with a good yield. More particularly, the process proceeds as follows: cytidine is suspended in an ester of acetic acid such as, for example, ethyl acetate, which is then refluxed for 1 to 2 hours with excessive dichlorophosphoric acid, or for 40 minutes to 2 hours either with a mixed solution of 5 to 20 times (molar ratio) as much phosphorus oxychloride and the same volume of t-butyl alcohol or with a mixed solution of 5 to 20 times (molar ratio) as much phosphorus oxybromide with the same volume of t-butyl alcohol, or refluxed for 40 minutes to 2 hours either with 5 to 20 times (molar ratio) as much partially hydrated phosphorus oxychloride or with 5 to 20 times (molar ratio) as much partially hydrated phosphorus oxybromide, to obtain 2,2'-cyclocytidine.

The solution is then distilled to remove the solvent without isolating the intermediate substance, and the remaining residue is treated with an alkali, such as, sodium hydroxide, potassium hydroxide, concentrated ammonia, sodium alcoholate, and potassium alcoholate to hydrolyze the anhydronucleoside at pH 9 to 12. This is treated, as described before, successively by adsorption on active charcoal, elution with an ammonia-alcohol mixed solution, and fractionation with Dowex-1 × 2 to obtain 1-β-D-arabino-furanosylcytosine.

The first and the second processes of this invention can be expressed by the following equations:

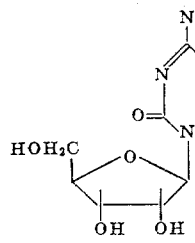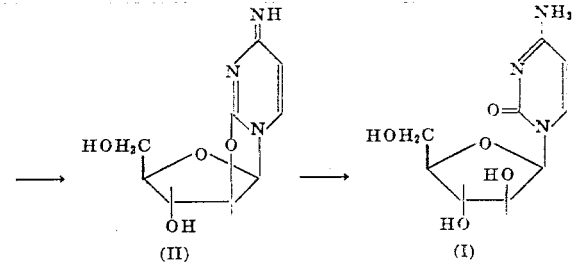

1-β-D-arabinofuranosylcytosine prepared in the first and the second processes of this invention can be made in the form of any salt type by adding an equivalent or slight excess of moles of an acid to its water solution, evaporating to dryness and recrystallizing from ethanol. Thus, the following salts of this compound can be prepared: salts of inorganic acids such as hydrochloric, sulfuric and nitric acids, and salts of organic acids such as formic, acetic, sulfosalicylic and orotic acids.

2,2'-cyclocytidine, obtained as an intermediate in the process of this invention, is an important material in synthesizing medicines such as arabinofuranosylcytosine and other substances related to nucleic acid.

So far, 2,2'-cyclocytidine has not been prepared in a simple process because of its instability and the consequent difficulties in isolation. 2,2'-cyclocytidine has been prepared by the following three processes:

1. E.R. Walwick and others (Proceedings of the Chemical Society, 84 (1960)) reacted cytidine with polyphosphoric acid and the by-product 2,2'-cyclocytidine-3', 5'-diphosphate was treated with an enzyme, phosphatase, to obtain the object substance. In this process, however, the disadvantages are the need of an enzyme, complicated operations of fractionation and purification and the low yield.

2. I.L. Doerr and others (Journal of Organic Chemistry, 32, 1462 (1967)) used as starting material 2'-chlorocytidine which was produced in 10 stages of operation from uridine, to obtain the object substance.

3. W.V. Ruyle and others (Journal of Medicinal Chemistry, 10, 331 (1967) ), on the other hand, used 2,4-dithio-2',3', 5'-triacetylarabinofuranosyluracil as a starting material which was produced in 7 stages of operation to obtain the object substance.

The processes (2) and (3), however, could not be operated easily, since they require multistage operation for the synthesis.

As a result of extensive investigations to improve the previous processes for preparing 2,2'-cyclocytidine with regard to their complexity and low yield, the present inventors have succeeded in preparing and isolating 2,2'-cyclocytidine in a single stage of operation from cytidine with ease and a high yield (approximately 70 percent), and hence thus enhancing the value of the compound.

The first process of this invention for preparing 2,2'-cyclocytidine comprises reacting cytidine with a halomethylenedimethylammonium halide expressed by the general formula,

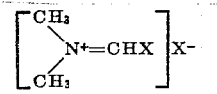

where X stands for Cl or Br.

In carrying out the process of this invention, cytidine is dissolved in a solvent such as dimethylformamide containing a halomethylenedimethylammonium halide and the mixture is stirred for several hours at a temperature near room temperature to obtain the object substance.

The halomethylenedimethylammonium halide to be used in the invention can be prepared by reacting dimethylformamide in an organic solvent for from several to ten minutes at approximately room temperature with an equimolar amount of a halogenating agent, such as, thionyl chloride, thionyl bromide, phosphorus oxychloride, phosphorus oxybromide, phosphorus trichloride, phosphorus tribromide, phosgene, phosphorus pentachloride, phosphorus pentabromide and chlorine. The halomethylenedimethylammonium halide for use in this invention may be synthesized in any of the known methods, and further this reagent may or may not be isolated from the reacting mixture of dimethylformamide and halogenating agent. Any solvents which dissolve cytidine and the reagent without decomposition can be used for the solvent in which the reaction of this invention proceeds, but dimethylformamide which is a component material for preparing the reagent is most conveniently used as the reaction solvent.

The 2,2'-cyclocytidine which is formed in the process of this invention can be isolated from the reaction solution in the following manner: the solution is poured into water to decompose the reagent and the product is adsorbed on Dowex-50(pyridinium type) and eluted with a formate buffer solution containing pyridine. If the fraction containing the object substance is evaporated to dryness, 2,2'-cyclocytidine is obtained as formate, while, if a water solution of the dried residue is made to flow through Dowex-1(Cl type) and the effluent solution is evaporated to dryness. 2,2'-cyclocytidine is obtained as hydrochloric acid salt.

The second process of this invention for preparing 2,2'-cyclocytidine with ease and high yield comprises adding cytidine for dissolution to partially hydrated phosphorus oxychloride, or partially hydrated phosphorus oxybromide, or a mixed solution of phosphorus oxychloride or phosphorus oxybromide in a tertiary alcohol such as tert-butyl alcohol, or dichlorophosphoric acid, and carrying out the reaction by heating for 40 minutes to 2 hours.

For the above described solvent in which the reaction proceeds, acetic acid ester such as ethyl acetate and others may be employed so long as they do not affect unfavorably the reaction.

As for the amounts of halogenating agents to be used in the process of this invention, partially hydrated phosphorus oxychloride and partially hydrated phosphorus oxybromide are used in a molar ratio of 5 to 20 times as much as the cytidine. Similarly mixed solutions of tertiary alcohol with phosphorus oxychloride or with phosphorus oxybromide (the ratio of mixing being 1 : 1 in volume) are prepared in the same molar ratio, that is from 5 to 20 times as much as cytidine. Dichlorophosphoric acid is added in an amount from 5 to 10 times (molar ratio).

2,2'-cyclocytidine prepared in the process of this invention can be isolated as follows: water is added directly to the reaction mixture to decompose the excessive reagent, and the resulting solution is treated with Dowex-50 (H$^+$ type) and the adsorbed substances, after being thoroughly washed with water, is eluted with a sodium chloride solution or a formate buffer solution containing pyridine. 2,2'-cyclocytidine is obtained by drying directly or, if needed, by drying after desalting the fraction which contains the compound.

2,2'-cyclocytidine prepared in the first and the second processes of this invention can be made in the form of any salt type by changing the type of the ion exchanging resin. Thus, the following salts of this compound can be prepared: salts of inorganic acids such as hydrochloric, sulfuric and nitric acids, and salts of organic acids such as formic, acetic sulfosalicylic and orotic acids.

These facts will be explained in detail by referring to examples below.

EXAMPLE 1

Thionyl chloride (3ml) was added to dimethylformamide (20ml) and the mixture was left standing for 10 min. at 30°C. Cytidine (2.0g) was added to it and allowed to react for 5 hours under stirring at room temperature. The reaction solution was poured into water (about 200ml) and sulfurous acid was removed by agitation and then the pH was adjusted to 9 with ammonia. After being kept for 10 min. at room temperature, the solution was brought again to pH 2 with hydrochloric acid and treated with active charcoal (20g). This was thoroughly washed with water, eluted with 50 percent ethanol containing 2 percent ammonia. The eluent was concentrated to dryness and treated with a 50ml column of Dowex 1 X 2 (OH type). After the unreacted cytidine was removed with 30 percent methyl alcohol, 1-$\beta$-D-arabinofuranosyl cytosine was eluted with a 0.1M solution of ammonium bicarbonate. The eluent was concentrated to dryness, and crystals of the 1-$\beta$-D-arabinofuranosyl-cytosine were obtained from ethanol.

Yield 1.40g (70.0 percent) m.p. 213° – 214° (decomp.)

$(\alpha)_D^{20°}$ ; +158° (C 0.5 in H$_2$O), UV;$\lambda_{max}$(pH 1) 282m$\mu$, $\lambda_{max}$(pH 7) 272m$\mu$, $\lambda$min(pH 1) 242m$\mu$, $\lambda$min(pH 7) 251m$\mu$.

Paper chromatography (Solvent: a mixture consisting of 5M ammonium acetate (pH 9.5), saturated solution of sodium borate, ethyl alcohol and 0.5M EDTA in the ratio of 20 : 80 : 220 : 0.5 v/v)

The R$_f$ value : 0.66 (coincident with that of the standard sample)

Paper electrophoresis (Sodium borate buffer solution of pH 6.5) : (coincident with that of the standard sample)

Analysis.

Calculated for C$_9$H$_{13}$N$_3$O$_5$:

C 44.45; H, 5.39; N 17.28 percent

Found :

C 44.37; H 5.51; N 17.22 percent

EXAMPLE 2

Thionyl bromide (3ml) was added to dimethylformamide (20ml) and the mixture was allowed to stand for 10min. at 30°C. Cytidine (2.0g) was added to it and was allowed to react for 5 hours under stirring at room temperature. The same treatment as in Example 1 was followed to obtain 1-$\beta$-D-arabinofuranosylcytosine. Yield: 1.20g (60 percent). Physical properties of the crystals were the same as those in Example 1.

EXAMPLE 3

To phosphorus pentachloride (2g) dissolved in carbon tetrachloride (20ml) was added dimethylformamide (0.8g). Precipitate produced was filtered off and washed with a small amount of carbon tetrachloride and the residue was dissolved in dimethylformamide (5ml). Cytidine (1.0g) was added to this solution and treated in the same manner as in Example 1 to obtain 1β-D-arabinofuranosylcytosine. Yield: 0.60g (60 percent). Physical properties were the same as those in Example 1.

EXAMPLE 4

Water (7.6ml) was added to ice-cooled phosphorus oxychloride (38.7ml) and stirred for 30min. This solution was added to ethyl acetate (500ml) in which cytidine (5g) had been suspended. The whole mixture was refluxed for 2 hours. The reaction solution was cooled and evaporated under reduced pressure. To the residue, a 2N solution of sodium hydroxide (1.15 liter) was added and kept at the room temperature for 24 hours under stirring. Subsequently, the solution was adjusted to pH 2 with concentrated hydrochloric acid (50ml), and condensed down to 250ml under reduced pressure. This solution was introduced into a column of active charcoal (60g) to adsorb nucleoside and the column was washed with a dilute hydrochloric acid solution of pH 2 until inorganic salts were no longer found in the eluate. Then elution was continued with water to make pH of the eluate larger than 4. Finally a mixed solution (1 liter) of methyl alcohol and ammonia in the ratio 4 : 1 was used as eluent to elute the nucleosides. The eluate was condensed to 100ml under reduced pressure, and then treated with a column of 60ml Dowex 1 × 2 (borate type). The portion of the solution containing the solutes which were not adsorbed and the eluate (400ml) obtained when eluted with water were gathered. Crystals were separated when the solution was evaporated to dryness under reduced pressure.

Methyl alcohol (15ml) was added to the lumps of crystals to crash them. After being filtered, the crystals were washed with methyl alcohol and dried to obtain 1-β-D-arabinofuranosylcytosine. Yield: 1.85g (37 percent). Physical properties were the same as those in Example 1.

EXAMPLE 5

A mixed solution of phosphorus oxychloride (38.7ml) and t-butyl alcohol (38.7ml) was added to ethyl acetate (500ml) in which cytidine (5g) had been suspended and the whole mixture was stirred for 1.5 hours at 60°C, and then refluxed for 40 min.

After being cooled, the reaction solution was mixed with a 2N sodium hydroxide solution (1.15 liters) and allowed to stand for 24 hours at the room temperature. Subsequently, pH was adjusted to 2 with concentrated hydrochloric acid (50ml) and the solution was condensed to 250ml under reduced pressure. Following the same procedure as in Example 4, 1-β-D-arabinofuranosylcytosine was obtained. Yield: 2.71g (54 percent). Physical properties coincided with those of Example 1.

EXAMPLE 6

Dichlorophosphoric acid (10g) was added to ethyl acetate (100ml) in which cytidine (1.0g) had been suspended and the mixture was refluxed for 1 hour. After being cooled, the reaction solution was concentrated and the residue produced was dissolved in a 2N solution of potassium hydroxide, adjusted to pH 11.5, kept standing for 24 hours at room temperature, brought to pH 2.0 with concentrated hydrogen chloride solution and finally concentrated down to 50ml under reduced pressure.

The resulting solution was treated with a column of active charcoal (12g) to adsorb the nucleosides, and the column was washed first with dilute hydrochloric acid of pH 2 until inorganic salts were no longer found in the eluate and then with water until the pH of the eluate reached 4 or more. Then a mixed solution (200ml) of methyl alcohol and ammonia in the ratio of 4 : 1 was introduced into the column in order to dissolve out the nucleosides. The eluate was concentrated to a volume of 20ml, and introduced into a column of 24ml Dowex 1 × 2 (OH type) to adsorb the nucleosides. A 30 percent solution of methyl alcohol (5 liters) was introduced to elute cytidine out selectively and a 0.1M solution of ammonium bicarbonate (2 liters) was introduced. The eluate was concentrated and the residue was mixed with alcohol, and evaporated again to dryness at the bath temperature 40°C under reduced pressure. The residue formed was dissolved in a small amount of methyl alcohol, left standing for 24 hours, then crystals of 1-β-D-arabinofuranosylcytosine were separated. Yield: 0.27g (27.0 percent). Physical properties were coincident with those of Example 1.

EXAMPLE 7

Thionyl chloride (3ml) was added to dimethylformamide (20ml) and kept standing for 10 min. at 30°C. The solution was mixed with cytidine (2.0g) and allowed to react for 5 hours under stirring at the room temperature. The reaction solution was poured into 200ml of water, stirred to expel sulfurous acid and introduced into a column of 100ml Dowex-50W × 4 (pyridinium type). The adsorbed species was eluted with a 0.1M formic acid-pyridine buffer solution (pH 5.0). The fraction containing the product was dried under reduced pressure, and crystals of 2,2'-cyclocytidine (formate) were obtained from methanol. Yield: 1.1g (45 percent). m.p. 173° – 178° (decomp.). U.V. (pH 1 – 5); λmax 231, 263mμ, λmin 218, 243mμ.

EXAMPLE 8

Thionyl bromide (3ml) was added to dimethylformamide (20ml) and was kept standing for 10min. at 30°C. Cytidine (2.0g) was added to it and the mixture was treated in the same manner as in Example 7 to obtain the crystals of 2,2'-cyclocytidine (formate). Yield: 1.0g (40 percent). Physical properties were coincident with those of Example 7.

EXAMPLE 9

To carbon tetrachloride (20ml) containing dissolved phosphorus pentabromide (2g) was added dimethylformamide (0.8g). Precipitate produced was separated by filtration and washed with carbon tetrachloride. The residue was dissolved in dimethylformamide (5ml) and cytidine (1g) was added to it. Following the same procedure as that of Example 7, this solution was treated to obtain 2,2'-cyclocytidine (formate). Yield: 0.50g (40 percent). Physical properties were coincident with those in Example 7.

EXAMPLE 10

Thionyl chloride (3ml) was added to dimethylformamide (20ml) and was kept standing for 10 min. at 30°C. Cytidine (2.0g) was added to it and allowed to react for 5 hours under stirring at the room temperature. The reaction solution was poured into water (200ml) and stirred to expel sulfurous acid, and then transferred to a column of 100ml Dowex-50W × 4 (pyridinium type). The adsorbed species were eluted with a 0.1M formic acid-pyridine buffer solution (pH 5.0).The fraction containing the product was dried under reduced pressure, dissolved again in water (50ml), and introduced into a column of Dowex- 1 × 2 (Cl type) (25ml). The eluate was condensed to dryness and crystals of the 2,2'-cyclocytidine (hydrochloride) were obtained from ethanol. Yield: 1.5g (65%). m.p. 258°–261° (decomp.). $(\alpha)_D^{20°}$ : −22.02° (C: 2.0 in $H_2O$). UV (pH 1 – 5): λ max 231 ( ϵ: 9700), 263.5 (10700) mμ; λmin 217.5 (7,000), 243.5 (6600) mμ. The melting point, the optical rotation and the ultraviolet spectrum of this compound were coincident with those of the standard sample.

EXAMPLE 11

To ice-cooled phosphorus oxychloride (75.5ml) water (14.8ml) was added and the mixture was stirred for 2 hours. This solution was then added to ethyl acetate (1.0 liter) in which cytidine (10g) had been suspended and the resulting mixture was heated for 20 min. at 50° to 70°C, followed by refluxing for 2 hours. The reaction solution, after being cooled, was concentrated and the residue formed was dissolved in 500ml of water, introduced into a column of 700ml Dowex-50W ($H^+$ type) which was then washed thoroughly with 16 liters of water. The adsorbed matters were eluted with 30 liters of a 2 percent solution of sodium chloride. The fraction containing the object substance was concentrated down to 500ml under reduced pressure. Sodium chloride separated was removed by filtration and the filtrate was concentrated to dryness. The residue was extracted with 50 percent ethanol and the ethanol was then distilled out. The remaining solution was treated again with a column of 250ml Dowex-50W (H type). The adsorbed matter was eluted with a 0.5N formic acid-pyridine buffer solution and evaporated to dryness. A water solution of the residue was passed through a column of 200ml Dowex-1 (Cl type) and then concentrated. Crystallization from water gave 7.85g (yield: 77.88 percent) of 2,2'-cyclocytidine (hydrochloride). Physical properties were coincident with those of Example 10.

EXAMPLE 12

A mixture of phosphorus oxychloride (38.7ml) and t-butyl alcohol (38.7ml) was added to ethyl acetate (500ml) in which cytidine (5g) had been suspended, and the resulting mixture was stirred for 1.5 hours at 60°C followed by refluxing for 40 min. After being cooled, the reaction solution was concentrated under reduced pressure and the residue was dissolved in 250ml of water. The solution was treated with a column of 350ml Dowex-50W ($H^+$ type) which was washed with 8 liters of water. Elution was conducted with a 0.5N formic acid-pyridine buffer solution and the fraction containing the object substance was concentrated to dryness to obtain 2,2'-cyclocytidine (formate). Physical properties were coincident with those obtained in Example 7.

EXAMPLE 13

To ethyl acetate (100ml) in which cytidine (1g) had been suspended dichlorophosphoric acid (10g) was added and refluxed for 1 hour. The reaction solution after being cooled was concentrated to dryness. The residue formed was dissolved in 50ml of water and introduced into a column of 70ml Dowex-50W ($H^+$ type) which was then washed with water and treated as in Example 12 to give 2,2'-cyclocytidine (formate). Yield: 0.82g (73.34 percent). The melting point and other physical properties were coincident with those obtained in Example 7.

EXAMPLE 14

Water (1.52ml) was added to ice-cooled phosphorus oxybromide (22.96g) and stirred for 30 min. This solution was added to ethyl acetate (100ml) in which cytidine (1.0g) was suspended and refluxed for 2 hours. The reaction solution, after being cooled, was concentrated to dryness. The residue formed was dissolved in water and introduced into a column of 70ml Dowex-50W ($H^+$ type) which was washed with water and then treated as in Example 11 to give 0.462g of 2,2'-cyclocytidine (hydrochloride). Yield: 42.78 percent. Physical properties were coincident with those obtained in Example 10.

I claim:

1. A process for preparing 1-β-D-arabinofuranosylcytosine or an inorganic acid salt or organic acid salt thereof consisting essentially of reacting cytidine, a mineral acid salt thereof, or a cytidine salt of an acid selected from the group consisting of formic acid, acetic acid, sulfosalicylic acid and crotic acid with at least one material selected from the group consisting of (a) a halomethylenedimethylammonium halide expressed by the general formula

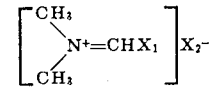

where $X_1$ and $X_2$ stand for the same or different halogen atoms and (b) a mixture of dimethylformamide and a halogenating agent to produce 2, 2'-cyclocytidine or said salt thereof and then hydrolyzing the 2, 2'-cyclocytidine or salt by mixing it with water and adjusting the pH of the mixture to a value from about 9 to 12.

2. A process according to claim 1 for preparing 1β-D-arabinofuranosylcytosine or a salt thereof wherein the halogenating agent is at least one substance selected from the group consisting of thionyl chloride, thionyl bromide, phosphorus oxychloride, phosphorus oxybromide, phosphorus trichloride, phosphorus tribromide, phosgene and chlorine.

3. A process according to claim 1 for preparing 1-β-arabinofuranosylcytosine or said salt thereof wherein the halogenating agent is phosphorus pentachloride, phosphorus pentabromide or a combination thereof.

4. A process for preparing 1-β-D-arabinofuranosylcytosine or an inorganic acid salt or organic acid salt thereof consisting essentially of reacting cytidine, a mineral acid salt thereof, or a cytidine salt of an acid selected from the group consisting of formic acid, acetic acid, sulfosalicyclic acid and crotic acid, with at least one substance selected from the group consisting of diphalophosphoric acid, phosphorus oxyhalides and partially hydrated phosphorus oxyhalides to produce 2, 2' cyclocytidine or said salt thereof and then hydrolyzing the 2, 2,'-cyclocytidine or salt by mixing it with water and adjusting the pH to a value from about 9 to 12.

5. A process according to claim 4 for preparing 1-β-D-arabinofuranosylcytosine or said salt thereof wherein an acetic acid ester is used as the reaction solvent.

6. A process for preparing 1-β-D-arabinofuranosylcytosine or an inorganic acid salt or organic acid salt thereof consisting essentially of reacting cytidine, a mineral acid salt thereof, or a cytidine salt of an acid selected from the group consisting of formic acid, acetic acid, sulfosalicylic acid and crotic acid, in an acetic acid ester as solvent with at least one substance selected from the group consisting of (a) dichlorophosphoric acid, (b) phosphorous oxychloride, (c) phosphorus oxybromide, (d) partially hydrated phosphorus oxychloride and (e) partially hydrated phosphorus oxybromide to produce 2, 2'-cyclocytidine or said salt thereof and then hydrolyzing the 2, 2'-cyclocytidine or said salt by mixing it with water and adjusting the pH of the mixture to a value from about 9 to 12.

7. A process according to claim 6 for preparing 1-β-D-arabinofuranosylcytosine or said salt thereof wherein phosphorus oxychloride or phosphorus oxybromide is added as a mixture with a tertiary alcohol to react with cytidine or said salt thereof.

8. A process according to claim 7 for preparing 1-β-D-arabinofuranosylcytosine or said salt thereof wherein the mentioned tertiary alcohol is tert-butanol.

9. A process according to claim 1 for preparing 1-β-D-arabinofuranosylcytosine or said salt thereof comprising directly hydrolyzing the 2,2'-cyclocytidine or said salt thereof as an intermediate without isolating the same from the reaction solution.

10. A process for preparing 2, 2'-cyclocytidine or an inorganic acid salt or organic acid salt thereof consisting essentially of reacting cytidine, a mineral salt thereof, or a cytidine salt of an acid selected from the group consisting of formic acid, acetic acid, sulfosalicyclic acid and crotic acid, with at least one material selected from the group consisting of (a) a halomethylenedimethylammonium halide expressed by the general formula

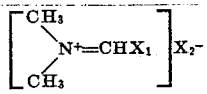

where $X_1$ and $X_2$ stand for halogen atoms of the same or different species, and (b) a mixture of dimethylformamide and a halogenating agent.

11. A process according to claim 10 for preparing 2,2'-cyclocytidine or said salt thereof wherein the halogenating agent is at least one substance selected from the group consisting of thionyl chloride, thionyl bromide, phosphorus oxychloride, phosphorus oxybromide, phosphorus trichloride, phosphorus tribromide, phosgene and chlorine.

12. A process according to claim 10 for preparing 2,2'-cyclocytidine or said salt thereof wherein the halogenating agent being is phosphorus pentachloride or phosphorus pentabromide.

13. A process for preparing 2, 2'-cyclocytidine or an inorganic acid salt or organic acid salt thereof consisting essentially of reacting cytidine, a mineral acid salt thereof, or a cytidine salt of an acid selected from the group consisting of formic acid acetic acid, sulfosalicylic acid and crotic acid, with at least one substance selected from the group consisting of dihalophosphoric acids, phosphorus oxyhalides and partially hydrated phosphorus oxyhalides.

14. A process according to claim 13 for preparing 2,2'-cyclocytidine or said salt thereof wherein an ester of acetic acid is used as the reaction solvent.

15. A process for preparing 2, 2'-cyclocytidine or an inorganic acid salt or organic acid salt thereof consisting essentially of reacting cytidine, a mineral acid salt thereof, or a cytidine salt of an acid selected from the group consisting of formic acid, acetic acid, sulfosalicylic acid and crotic acid, in an ester of acetic acid as solvent with at least one substance selected from the group consisting of (a) dichlorophosphoric acid, (b) phosphorus oxychloride, (c) phosphorus oxybromide, (d) partially hydrated phosphorus oxychloride and (e) partially hydrated phosphorus oxybromide.

16. A process according to claim 15 for preparing 2,2'-cyclocytidine or a said salt thereof comprising applying phosphorus oxychloride or phosphorus oxybromide in the form of a mixture with a tertiary alcohol to react with cytidine or a said salt thereof.

17. A process according to claim 16 for preparing 2,2'-cyclocytidine or said salt thereof wherein the tertiary alcohol is tert-butanol.

* * * * *